Nov. 7, 1939.   E. E. SAX   2,178,971
BARBECUE FORK
Filed March 27, 1937
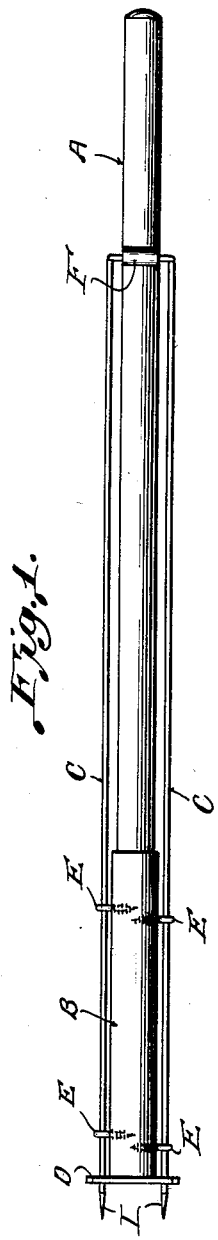
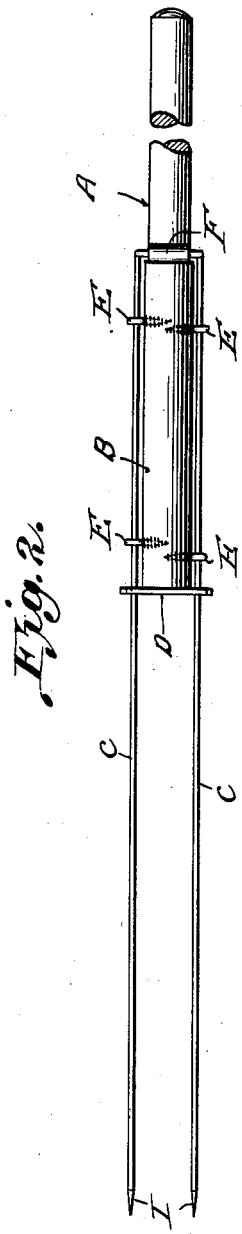
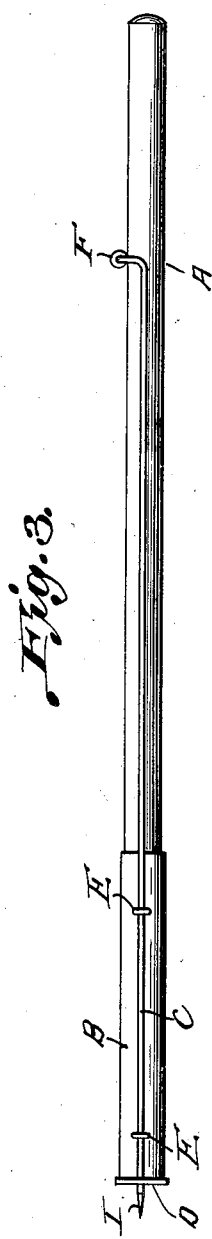
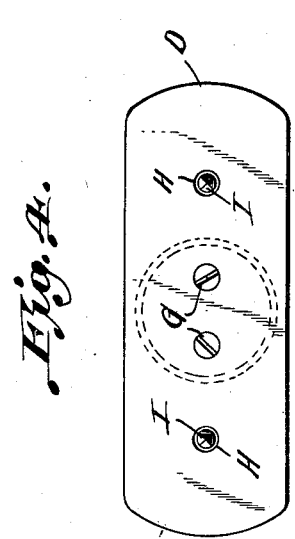
Inventor:
Eugene E. Sax Patented Nov. 7, 1939

2,178,971

UNITED STATES PATENT OFFICE 2,178,971

BARBECUE FORK

Eugene E. Sax, Los Angeles, Calif.

Application March 27, 1937, Serial No. 133,473

3 Claims. (Cl. 30—129)

My invention is a fork like structure of adequate size, with long prongs for impaling the food to be roasted, and which may be extended or retracted, depending upon the will of the operator, and having means for removing the food or other object placed on the prongs without the necessity of touching same. The object of the invention is to produce a barbecue fork of simple construction, particularly adapted for heating or roasting food over a flame or open fire, without danger to the operator, and constructed so as to facilitate removing the food or other articles at the will of the operator without the necessity of touching the same.

I attain these objects by the mechanism illustrated in the accompanying drawing. The accompanying drawing shows four (4) views of the instrument.

Figure 1 is a top view of the instrument with the tines or fork member thereof fully retracted along the handle part of the instrument.

Figure 2 is a top view of the instrument with the tines or fork member thereof fully extended.

Figure 3 is a side view of the instrument with the tines fully retracted.

Figure 4 is a front view of the instrument with the prongs retracted disclosing merely the front end plate and the tips of the tines.

Reference is here made to the letters thereon. A is a handle of wood or other non-conducting material for heat and of a suitable diameter for being held in one's hand and of a sufficient length to reach an open fire without discomfort or danger to the operator.

B is a metal tube or sleeve which, if desired, may be slightly more than one-quarter the length of A, covering one end of the handle and designed to protect the handle from scorching.

E consists of four or more eye screws mounted on the handle at right angles thereto through the metal sheath at a suitable distance apart and in line with each other to act as guides and supports for the prongs C. These prongs, C, are slightly more than three-quarters the length of A and consist of a U-shaped stout wire, the prongs of which are somewhat farther apart than the diameter of a cross-section of the handle. D is a cross-head or end plate mounted on the flat end of the sheathed part of the handle by means of two flat headed screws G, and whose diameter is somewhat larger than the diameter of the cross-section of the handle, and which contains holes H drilled on opposite sides, which holes are in a line with the openings in the eye screws. C, the U shaped prongs, are mounted on the handle in such a manner that the closed part of the U is toward the operator, and the prongs are slid through the holes drilled in the end metal plate D. The closed end of the U prongs is bent upward or laterally to form a lateral extension F and a suitable wooden or non-heat conducting hand-knob F is placed thereon to form a grip for extending or retracting the prongs. The points I of the prongs C, will hold the food or other articles to be heated thereon.

It will be evident that the prongs can be extended out beyond the end plate for approximately two-thirds their length, or completely retracted along the handle, thus operating as a compact collapsible fork, easily stored or transported, safe for use and convenient for multiple heating and roasting of foods or other articles, without the necessity of the use of the hands, except to hold and operate the instrument.

I claim as my invention

1. A handle fork and ejector device consisting of a handle with a metal tube sleeved on one end thereof, metal eyelets projecting from opposite sides of said tube, a laterally extending metal plate connected to said tube across the outer end thereof, said plate having two holes respectively in line with said eyelets, a U-shaped fork slidably engaging said eyelets and holes, said fork having parallel tines, and said tines being disposed longitudinally along the handle with the open or free ends of the U-shaped fork pointing toward the said metal plate substantially as described.

2. A barbecue fork consisting of a pair of tines formed from a single length of wire bent into an elongated U, the rear end whereof is formed with a lateral extension disposed at an angle to the sides of the said elongated U, a non-heat-conducting handle-knob attached to said extension, a handle with a metal sleeve on its forward end with metal eyelets projecting from opposite sides of the same, a laterally extending cross-head connected to said sleeve across the outer end thereof, and having two guide openings respectively in line with said eyelets, said eyelets and holes slidably engaging the aforesaid pair of tines with the open or free ends thereof pointing towards the said metal plate.

3. In a barbecue fork, the combination of an elongated insulated handle, a tubular sleeve attached to the inner end thereof and having a laterally extending cross-head at its forward end, a fork having a pair of oppositely disposed tines extending along the handle on opposite sides thereof, guiding means for said tines carried by the tubular sleeve, an operating handle for the tines connecting the same at their rear ends enabling the tines to be extended through the said cross-head to impale and carry the food to be roasted, and enabling the tines to be retracted to enable the cross-head to eject the food impaled on the tines.

EUGENE E. SAX.